US008909305B2

(12) United States Patent  
Guedalia et al.

(10) Patent No.: US 8,909,305 B2  
(45) Date of Patent: Dec. 9, 2014

(54) METHOD AND SYSTEM FOR ACTIVATING AN APPLICATION ON A MOBILE DEVICE

(75) Inventors: Isaac David Guedalia, Bet Shemesh (IL); Jacob Guedalia, Newton, MA (US)

(73) Assignee: Qualcomm Connected Experiences, Inc., San Diego, CA (US)

(*) Notice: Subject to any disclaimer, the term of this patent is extended or adjusted under 35 U.S.C. 154(b) by 588 days.

(21) Appl. No.: 12/465,405

(22) Filed: May 13, 2009

(65) Prior Publication Data

US 2009/0286524 A1 Nov. 19, 2009

Related U.S. Application Data

(60) Provisional application No. 61/052,876, filed on May 13, 2008.

(51) Int. Cl.
| | |
|---|---|
| *H04M 1/00* | (2006.01) |
| *H04M 3/42* | (2006.01) |
| *G08C 17/00* | (2006.01) |
| *H04M 1/725* | (2006.01) |

(52) U.S. Cl.  
CPC ...... *H04M 1/72522* (2013.01); *H04M 1/72547* (2013.01)  
USPC .......................... 455/574; 455/414.2; 370/311

(58) Field of Classification Search  
USPC ................ 455/574, 572, 414.1, 414.2, 414.3; 370/311  
See application file for complete search history.

(56) References Cited

U.S. PATENT DOCUMENTS

| | | | | |
|---|---|---|---|---|
| 5,797,094 | A * | 8/1998 | Houde et al. ................ | 455/412.2 |
| 6,236,674 | B1 * | 5/2001 | Morelli et al. ................ | 375/219 |
| 6,289,228 | B1 * | 9/2001 | Rotstein et al. ............... | 455/574 |
| 8,015,249 | B2 * | 9/2011 | Nayak et al. .................. | 709/206 |
| 2005/0049013 | A1 * | 3/2005 | Chang et al. .................. | 455/574 |
| 2005/0066207 | A1 * | 3/2005 | Fleck et al. ................... | 713/320 |
| 2007/0015480 | A1 * | 1/2007 | Mason ........................ | 455/186.1 |
| 2008/0081647 | A1 * | 4/2008 | Lee et al. ...................... | 455/466 |
| 2008/0132252 | A1 * | 6/2008 | Altman et al. ................ | 455/457 |
| 2010/0017637 | A1 * | 1/2010 | Rosay ........................... | 713/323 |

* cited by examiner

*Primary Examiner* — Christopher M Brandt  
(74) *Attorney, Agent, or Firm* — Muncy, Geissler, Olds & Lowe, P.C.

(57) ABSTRACT

A system for running an application on a mobile device may include a mobile device having an application associated with a service provider, a computing device in communication with the mobile device and a computer readable storage medium in communication with the computing device. The computer readable storage medium may have one or more programming instructions for determining an inactive time associated with the mobile device, determining whether the inactive time is equal to or greater than a threshold value and in response to the inactive time being equal to or greater than the threshold value, sending a message to the mobile device. The inactive time may represent a length of a period of inactivity associated with the mobile device, and the message may include one or more instructions to activate the application.

26 Claims, 2 Drawing Sheets

METHOD AND SYSTEM FOR ACTIVATING AN APPLICATION ON A MOBILE DEVICE

CROSS REFERENCE TO RELATED APPLICATIONS

This application claims priority to U.S. Provisional Application No. 61/052,876 filed May 13, 2008, the entirety of which is incorporated by reference herein.

Not Applicable

BACKGROUND

Certain mobile devices are configured to run various applications when the mobile device is powered on. However, a number of mobile devices do not have an automatic startup mode, so applications are not automatically run upon power-up of the mobile device. Therefore, if a user wants to use an application on a mobile device, a time lag exists between mobile device power-up and the opening and running of the application.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

In an embodiment, a system for running an application on a mobile device may include a mobile device having an application associated with a service provider, a computing device in communication with the mobile device and a computer readable storage medium in communication with the computing device. The computer readable storage medium may have one or more programming instructions for determining an inactive time associated with the mobile device, determining whether the inactive time is equal to or greater than a threshold value and in response to the inactive time being equal to or greater than the threshold value, sending a message to the mobile device. The inactive time may represent a length of a period of inactivity associated with the mobile device, and the message may include one or more instructions to activate the application.

In an embodiment, a method of running an application on a mobile device may include determining, by a computing device, an inactive time associated with a mobile device, determining whether the inactive time is equal to or greater than a threshold value and in response to the inactive time being equal to or greater than the threshold value, sending a message to the mobile device. The inactive time may represent a length of a period of inactivity associated with the mobile device, and the message may include one or more instructions to activate the application.

BRIEF DESCRIPTION OF THE DRAWINGS

Aspects, features, benefits and advantages of the present invention will be apparent with regard to the following description and accompanying drawings, of which.

DETAILED DESCRIPTION

In an embodiment, a mobile device may be in communication with one or more computing devices. A mobile device may be a portable, electronic device that may have a processor and a processor-readable storage medium in communication with the processor. Exemplary mobile devices may include cellular phones, PDAs, media players and/or the like. A computing device may be a processor, a server and/or the like.

In an embodiment, a computing device may be associated with a service provider. Exemplary service providers may include wireless service providers, voice-over Internet protocol providers ("VoIP"), mobile solution providers, mobile-to-personal computer ("PC") communication providers and/or the like. In an embodiment, a service provider may have a corresponding wireless network. A wireless network may enable communication between a plurality of mobile devices, computing devices and/or the like.

In an embodiment, a mobile device may include one or more applications associated with a service provider. An application may be a software application, a hardware application and/or a combination of software and hardware.

Figure 1:
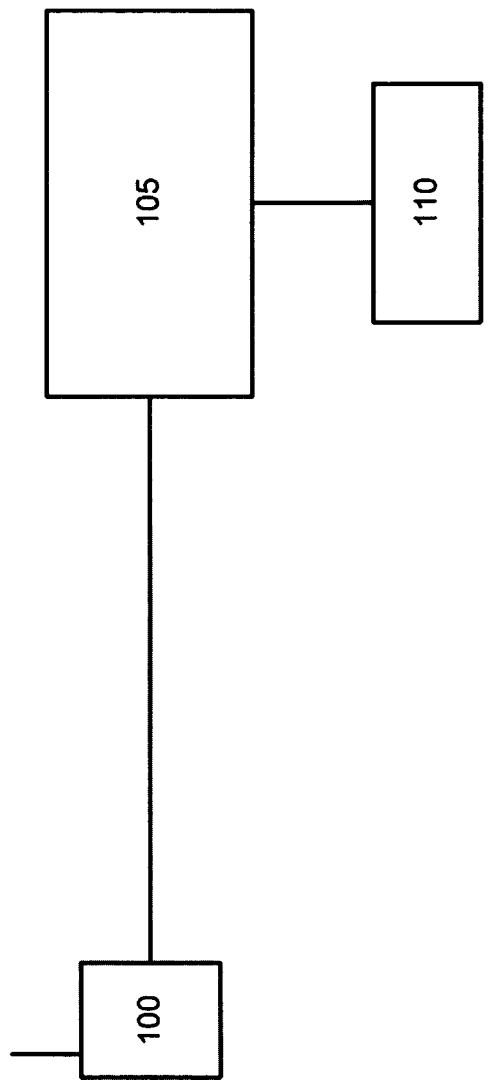
FIG. 1 illustrates an exemplary mobile device system according to an embodiment.

FIG. 1 illustrates an exemplary mobile device system according to an embodiment. As illustrated by FIG. 1, a mobile device 100 may be in communication with a computing device 105. The computing device 105 may be associated with a service provider. In an embodiment, the computing device 105 may be in communication with a computer readable storage medium 110.

Figure 2:
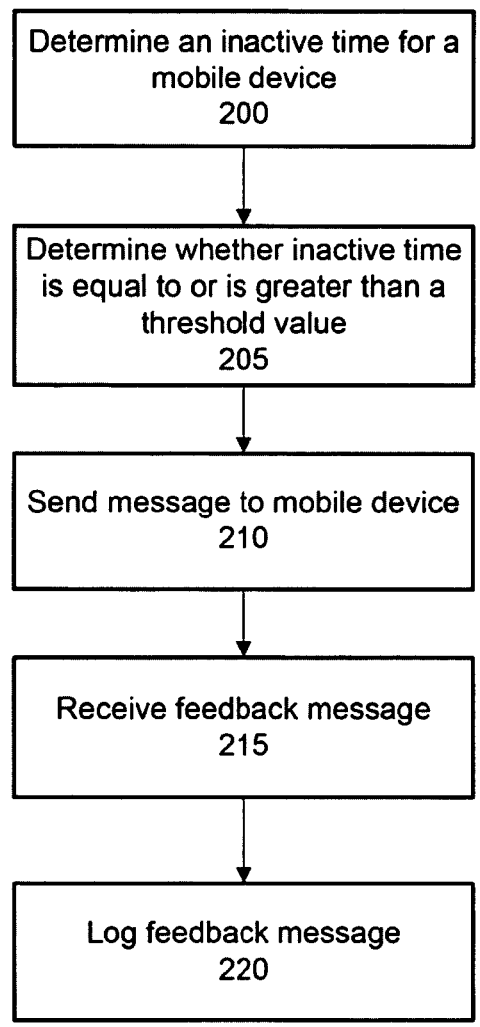
FIG. 2 illustrates an exemplary method of running an application on a mobile device according to an embodiment.

FIG. 2 illustrates an exemplary method of running an application on a mobile device according to an embodiment. As illustrated by FIG. 2, a computing device may determine 200 an inactive time associated with a mobile device. An inactive time may be a duration of a period of inactivity associated with the mobile device.

In an embodiment, a period of inactivity may be one during which a mobile device is operating in a sleep mode, a standby mode, a hibernation mode and/or the like. In an embodiment, a sleep mode and/or a standby mode may be a low power mode associated with a mobile device. Sleep mode and/or standby mode may reduce electrical consumption of the mobile device when it is idle.

In an embodiment, a hibernation mode may be a feature of a mobile device where the contents of the mobile device's memory are written to non-volatile storage prior to the mobile device powering off. In an embodiment, the mobile device may be restored to the state it was in when hibernation mode began. In an embodiment, a period of inactivity may be one during which time a mobile device is powered off.

In an embodiment, a computing device may receive a notification from a mobile device when the mobile device begins a period of inactivity. In an embodiment, a computing device may receive a notification from a mobile device when the mobile device exits a period of inactivity. In an embodiment, the computing device may track the inactive time associated with a mobile device. For example, a computing device may begin a clock or other counter when it receives a notification that a mobile device is beginning a period of inactivity. This clock or counter may be stopped and/or reset when the mobile device exits its period of inactivity.

In an embodiment, a computing device may determine 205 whether the inactive time associated with a mobile device is equal to or greater than a threshold value. In an embodiment, a threshold value may be an amount of time determined by a user, administrator and/or the like. If the inactive time equals or is greater than the threshold value, the computing device may send 210 a message to the mobile device. In an embodiment, the message may be a text message, such as an short message service ("SMS") message, a multimedia message service ("MMS") message and/or the like. In an embodiment, a message may be sent to a mobile device at a particular time.

In an embodiment, the message may instruct the mobile device to become active. For example, the message may instruct the mobile device to exit sleep mode, exit standby mode, exit hibernation mode and/or the like. In an embodiment, the message may instruct the mobile device to run an application associated with the computing device.

In an embodiment, if the computing device sends a message to a mobile device while the mobile device is powered off, the mobile device may receive the message when the mobile device is powered on. The message may instruct the mobile device to run an application when the mobile device is powered on.

In an embodiment, the message may activate an application, however the application may remain in the background and may not be run. In an embodiment, the application may determine how long the mobile device has been active. If the amount of time the mobile device has been active is greater than a threshold value, the application may become inactive. In an embodiment, an application may determine how long the mobile device has been powered on. If the mobile device has been on for an amount of time less than a threshold value, the application may execute.

In an embodiment, a feedback message may be received 215 from the mobile device. A feedback message may confirm receipt of the message by the mobile device. In an embodiment, when a computing device receives a feedback message, it may log 220 the receipt of such message. In an embodiment, if a feedback message is received from a mobile device, a subsequent message may not be sent to that mobile device. In an embodiment, if a feedback message is not received from a mobile device within a certain period of time, a computing device may send one or more messages to the mobile device. In an embodiment, messages may be sent until a feedback message is received from the mobile device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A non-transitory computer-readable storage medium comprising:
    at least one instruction for determining an inactive time associated with a mobile device, wherein the inactive time represents a length of a period of inactivity associated with the mobile device;
    at least one instruction for determining whether the inactive time is equal to or greater than a threshold value; and
    at least one instruction for sending, in response to the inactive time being equal to or greater than the threshold value, a message to the mobile device, wherein the message identifies an inactive application associated with the mobile device and comprises one or more instructions to activate the inactive application in a background mode.

2. The non-transitory computer-readable storage medium of claim 1, wherein the at least one instruction for determining the inactive time comprises:
    at least one instruction for receiving a notification from the mobile device when the mobile device begins the period of inactivity; and
    at least one instruction for starting, in response to receiving the notification, a clock, wherein the clock is configured to measure a duration of the period of inactivity.

3. The non-transitory computer-readable storage medium of claim 2, wherein the at least one instruction for determining the inactive time comprises:
    at least one instruction for receiving a second notification from the mobile device when the mobile device ends the period of inactivity; and
    at least one instruction for performing, in response to receiving the second notification, one or more of the following: stopping the clock, or resetting the clock.

4. The non-transitory computer-readable storage medium of claim 2, wherein the at least one instruction for receiving the notification from the mobile device comprises:
    at least one instruction for receiving a notification from the mobile device when the mobile device enters sleep mode.

5. The non-transitory computer-readable storage medium of claim 2, wherein the at least one instruction for receiving a notification from the mobile device comprises:
    at least one instruction for receiving a notification from the mobile device when the mobile device enters hibernation mode.

6. The non-transitory computer-readable storage medium of claim 1, wherein the at least one instruction for determining whether the inactive time is equal to or greater than the threshold value comprises:
    at least one instruction for comparing the inactive time to the threshold value, wherein the threshold value is determined by a user.

7. The non-transitory computer-readable storage medium of claim 1, wherein the at least one instruction for sending the message to the mobile device comprises at least one instruction for sending one or more of the following:
    a short message service message; or
    a multimedia message service message.

8. The non-transitory computer-readable storage medium of claim 1, further comprising:
    at least one instruction for receiving from the mobile device and in response to sending the message, a feedback message configured to confirm receipt by the mobile device of the message.

9. The non-transitory computer-readable storage medium of claim 8, further comprising:
    at least one instruction for logging the feedback message.

10. The non-transitory computer-readable storage medium of claim 1, wherein the at least one instruction for sending the message to the mobile device comprises at least one instruction for repeating the sending until a feedback message is received from the mobile device.

11. A method of running an application on a mobile device, the method comprising:
    determining, by a computing device, an inactive time associated with the mobile device, wherein the inactive time represents a length of a period of inactivity associated with the mobile device;
    determining whether the inactive time is equal to or greater than a threshold value; and
    in response to the inactive time being equal to or greater than the threshold value, sending a message to the mobile device, wherein the message identifies an inactive application and comprises one or more instructions to activate the inactive application in a background mode.

12. The method of claim 11, wherein determining the inactive time comprises:
receiving a notification from the mobile device when the mobile device begins the period of inactivity; and
in response to receiving the notification, starting a clock, wherein the clock is configured to measure a duration of the period of inactivity.

13. The method of claim 12, wherein determining the inactive time comprises: receiving a second notification from the mobile device when the mobile device ends the period of inactivity; and
in response to receiving the second notification, performing one or more of the following: stopping the clock, or resetting the clock.

14. The method of claim 12, wherein receiving the notification from the mobile device comprises receiving the notification from the mobile device when the mobile device enters sleep mode.

15. The method of claim 12, wherein receiving the notification from the mobile device comprises receiving the notification from the mobile device when the mobile device enters hibernation mode.

16. The method of claim 11, wherein determining whether the inactive time is equal to or greater than a threshold value comprises comparing the inactive time to the threshold value, wherein the threshold value is determined by a user.

17. The method of claim 11, wherein sending the message to the mobile device comprises sending one or more of the following: a short message service message; or a multimedia message service message.

18. The method of claim 11, further comprising:
in response to sending the message, receiving, from the mobile device, a feedback message configured to confirm receipt by the mobile device of the message.

19. The method of claim 18, further comprising logging, by the computing device, the feedback message.

20. The method of claim 11, wherein sending a message to the mobile device comprises repeating the sending until a feedback message is received from the mobile device.

21. The method of claim 11, wherein the inactive time is a period of time during which the mobile device is powered off.

22. The method of claim 11, wherein the message instructs the mobile device to exit a sleep mode, exit a standby mode, or exit a hibernation mode.

23. The method of claim 11, wherein the inactive application executes based on the mobile device having been powered on for an amount of time less than the threshold value.

24. The method of claim 11, wherein the inactive application becomes inactive based on the mobile device having been active for an amount of time greater than the threshold value.

25. An apparatus for running an application on a mobile device, the apparatus comprising:
logic configured to determine, by a computing device, an inactive time associated with the mobile device, wherein the inactive time represents a length of a period of inactivity associated with the mobile device;
logic configured to determine whether the inactive time is equal to or greater than a threshold value; and
logic configured to send, in response to the inactive time being equal to or greater than the threshold value, a message to the mobile device, wherein the message identifies an inactive application and comprises one or more instructions to activate the inactive application in a background mode.

26. An apparatus for running an application on a mobile device, the apparatus comprising:
means for determining, by a computing device, an inactive time associated with the mobile device, wherein the inactive time represents a length of a period of inactivity associated with the mobile device;
means for determining whether the inactive time is equal to or greater than a threshold value; and
means for sending, in response to the inactive time being equal to or greater than the threshold value, a message to the mobile device, wherein the message identifies an inactive application and comprises one or more instructions to activate the inactive application in a background mode.

* * * * *